United States Patent
Singh et al.

(10) Patent No.: US 12,445,997 B2
(45) Date of Patent: Oct. 14, 2025

(54) CALIBRATION PROCEDURE FOR ACCURATE POSITIONING OF INTELLIGENT REFLECTIVE SURFACES

(71) Applicant: Dell Products L.P., Round Rock, TX (US)

(72) Inventors: Tejinder Singh, Kanata (CA); Davi V. Q. Rodrigues, Lubbock, TX (US)

(73) Assignee: Dell Products L.P., Round Rock, TX (US)

( * ) Notice: Subject to any disclaimer, the term of this patent is extended or adjusted under 35 U.S.C. 154(b) by 370 days.

(21) Appl. No.: 18/296,144

(22) Filed: Apr. 5, 2023

(65) Prior Publication Data

US 2024/0340846 A1 Oct. 10, 2024

(51) Int. Cl.
*H04L 1/00* (2006.01)
*H04B 7/04* (2017.01)
*H04W 64/00* (2009.01)

(52) U.S. Cl.
CPC ...... *H04W 64/003* (2013.01); *H04B 7/04013* (2023.05)

(58) Field of Classification Search
CPC .......................... H04W 64/003; H04B 7/04013
USPC ...................................... 455/456.1
See application file for complete search history.

(56) References Cited

U.S. PATENT DOCUMENTS

2023/0291610 A1* 9/2023 Pakrooh ............... H04L 25/0212
2024/0310470 A1* 9/2024 Schweizer ............ G01S 5/0273

FOREIGN PATENT DOCUMENTS

CN 114665942 A * 6/2022 ........... H04B 7/0857
WO WO-2022148093 A1 * 7/2022 ........... G01S 5/0273

OTHER PUBLICATIONS

Q. Wu and R. Zhang, "Towards Smart and Reconfigurable Environment: Intelligent Reflecting Surface Aided Wireless Network," IEEE Communications Magazine, vol. 58, No. 1, pp. 106-112, Jan. 2020 (Date of Publication: Nov. 22, 2019), doi: 10.1109/MCOM.001.1900107.

(Continued)

*Primary Examiner* — Tanmay K Shah
(74) *Attorney, Agent, or Firm* — Amin, Turocy & Watson, LLP

(57) ABSTRACT

The technology described herein is directed towards a calibration procedure for remote estimation of the position and orientation of an intelligent reflective surface. The calibration is based on accurate estimation of the relative distances between each element of an intelligent reflective surface and a transmission-reception point, e.g., radar sensor, wireless access point and/or base station. A multifrequency (e.g., dual-tone) calibration signal is transmitted to selected elements of the intelligent reflective surface, with the returned calibration signals used to determine the distance to each selected element, from which distances to other elements are determined, along with the intelligent reflective surface's orientation. An active backscatter tag that boosts the returned signal improves the distance measurement accuracy. From the data obtained, the phase delays along the path linking a target and any element of the intelligent reflective surface, and the path linking that element and the transmission-reception point can be directly determined.

20 Claims, 12 Drawing Sheets

(56) References Cited

OTHER PUBLICATIONS

M. A. El-Mossallamy, H. Zhang, L. Song, K. G. Seddik, Z. Han and G. Y. Li, "Reconfigurable Intelligent Surfaces for Wireless Communications: Principles, Challenges, and Opportunities," IEEE Transactions on Cognitive Communications and Networking, vol. 6, No. 3, pp. 990-1002, Sep. 2020 (Date of Publication: May 5, 2020), doi: 10.1109/TCCN.2020.2992604.

R. Long, Y.-C. Liang, Y. Pei and E. G. Larsson, "Active Reconfigurable Intelligent Surface-Aided Wireless Communications," IEEE Transactions on Wireless Communications, vol. 20, No. 8, pp. 4962-4975, Aug. 2021 (Date of Publication: Mar. 12, 2021), doi: 10.1109/TWC.2021.3064024.

A. Strobel, C. Carlowitz, R. Wolf, F. Ellinger, and M. Vossiek, "A millimeter-wave low-power active backscatter tag for FMCW radar systems," IEEE Transactions on Microwave Theory and Techniques, vol. 61, No. 5, pp. 1964-1972, May 2013 (Date of Publication: Apr. 4, 2013).

G. C. Alexandropoulos, I. Vinieratou and H. Wymeersch, "Localization via Multiple Reconfigurable Intelligent Surfaces Equipped with Single Receive RF Chains," IEEE Wireless Communications Letters, vol. 11, No. 5, pp. 1072-1076, Date of Publication: Mar. 3, 2022, doi: 10.1109/LWC.2022.3156427.

S. Buzzi, E. Grossi, M. Lops and L. Venturino, "Foundations of MIMO Radar Detection Aided by Reconfigurable Intelligent Surfaces," IEEE Transactions on Signal Processing, vol. 70, pp. 1749-1763, 2022 (Date of Publication: Mar. 9, 2022), doi: 10.1109/TSP.2022.3157975.

D. V. Q. Rodrigues and C. Li, "RF-Tag-Referenced Structural Displacement Measurements with Multiple Moving Interferers," in Proc. IEEE Topical Conference on Wireless Sensors and Sensor Networks (WiSNeT), Date of Conference: Jan. 16-19, 2022, pp. 14-17, doi: 10.1109/WiSNet53095.2022.9721376.

J. Wang, T. Karp, J.-M. Muñoz-Ferreras, R. Gómez-García and C. Li, "A Spectrum-Efficient FSK Radar Technology for Range Tracking of Both Moving and Stationary Human Subjects," IEEE Transactions on Microwave Theory and Techniques, vol. 67, No. 12, pp. 5406-5416, Dec. 2019 (Date of Publication: Oct. 3, 2019), doi: 10.1109/TMTT.2019.2941189.

* cited by examiner

FIG. 11

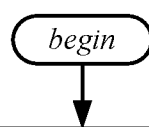

1102 — TRANSMITTING A FIRST MULTIFREQUENCY SIGNAL FROM A TRANSMISSION AND RECEPTION LOCATION TO A FIRST SELECTED ELEMENT OF AN INTELLIGENT REFLECTIVE SURFACE, AND RECEIVING AT THE TRANSMISSION AND RECEPTION LOCATION A FIRST REFLECTED SIGNAL FROM THE FIRST SELECTED ELEMENT IN RESPONSE TO THE TRANSMITTING OF THE FIRST MULTIFREQUENCY SIGNAL

1104 — TRANSMITTING A SECOND MULTIFREQUENCY SIGNAL FROM THE TRANSMISSION AND RECEPTION LOCATION TO A SECOND SELECTED ELEMENT OF AN INTELLIGENT REFLECTIVE SURFACE, AND RECEIVING AT THE TRANSMISSION AND RECEPTION LOCATION A SECOND REFLECTED SIGNAL FROM THE SECOND SELECTED ELEMENT IN RESPONSE TO THE TRANSMITTING OF THE SECOND MULTIFREQUENCY SIGNAL

1106 — TRANSMITTING A THIRD MULTIFREQUENCY SIGNAL FROM THE TRANSMISSION AND RECEPTION LOCATION TO A THIRD SELECTED ELEMENT OF AN INTELLIGENT REFLECTIVE SURFACE, AND RECEIVING AT THE TRANSMISSION AND RECEPTION LOCATION A THIRD REFLECTED SIGNAL FROM THE THIRD SELECTED ELEMENT IN RESPONSE TO THE TRANSMITTING OF THE THIRD MULTIFREQUENCY SIGNAL

1108 — DETERMINING A FIRST DISTANCE FROM THE TRANSMISSION AND RECEPTION LOCATION RELATIVE TO THE FIRST SELECTED ELEMENT BASED ON THE FIRST MULTIFREQUENCY SIGNAL AND THE FIRST REFLECTED SIGNAL, AND DETERMINING A FIRST POINT ON THE INTELLIGENT REFLECTIVE SURFACE, CORRESPONDING TO THE FIRST ELEMENT, BASED ON THE FIRST DISTANCE

to FIG. 12

CALIBRATION PROCEDURE FOR ACCURATE POSITIONING OF INTELLIGENT REFLECTIVE SURFACES

BACKGROUND

Intelligent reflective surfaces are expected to play an important role in beyond fifth (B5G) and sixth generation (6G) wireless networks, and likely wireless networks based on even higher frequencies. Intelligent reflective surfaces include a large number of low-cost passive or active elements that intelligently regulate wireless signal reflection. Specifically, based on electromagnetic scattering principles, each reflective element is able to reflect impinging radio frequency signals with an adjustable reflecting coefficient (amplitude and phase). By adjusting the reflecting coefficients at each reflective element, an intelligent reflective surface is able to enhance the signal reception at desired destinations and/or suppress the interference to unintended users, thereby artificially creating favorable propagation conditions and enhancing existing wireless communication.

Wireless localization is a process to determine the location of wireless devices in a network or the location of a target in an indoor/outdoor environment. Localization methods include the time of arrival, the angle of arrival, the angle of departure, the received signal strength indicator (RSSI), and the channel state information (CSI). The accuracy of finding the position of the intelligent reflective surface and the phase delays between each element of the intelligent reflective surface and the base station/access point/sensing system is significant with respect to phase shifts optimization for intelligent reflective surface-assisted wireless networks.

Current solutions for phase shifts optimization rely on CSI, RSSI, or other such measurements that lack the sensitivity and accuracy needed to properly estimate the phase delays between the base station/access point/sensing system and the elements of the intelligent reflective surface. Current solutions that address the problem of the phase shifts optimization of an intelligent reflective surface assume that the mutual position and orientation of the radar/access point, intelligent reflective surface, and a target/user are suggested, but do not provide any practical scheme to do so. Further, current phase shifts optimization techniques mostly require a very large computational load to handle convex/non-convex constraints for optimal/suboptimal solutions to be generated for an intelligent reflective surface reflection matrix design.

BRIEF DESCRIPTION OF THE DRAWINGS

The technology described herein is illustrated by way of example and not limited in the accompanying figures in which like reference numerals indicate similar elements and in which:

FIGS. 11 and 12 comprise a flow diagram showing example operations related to determining first, second and third distances from a transmission and reception location to first, second and third elements, respectively, of an intelligent reflective surface, in accordance with various aspects and implementations of the subject disclosure.

DETAILED DESCRIPTION

Figure 1:
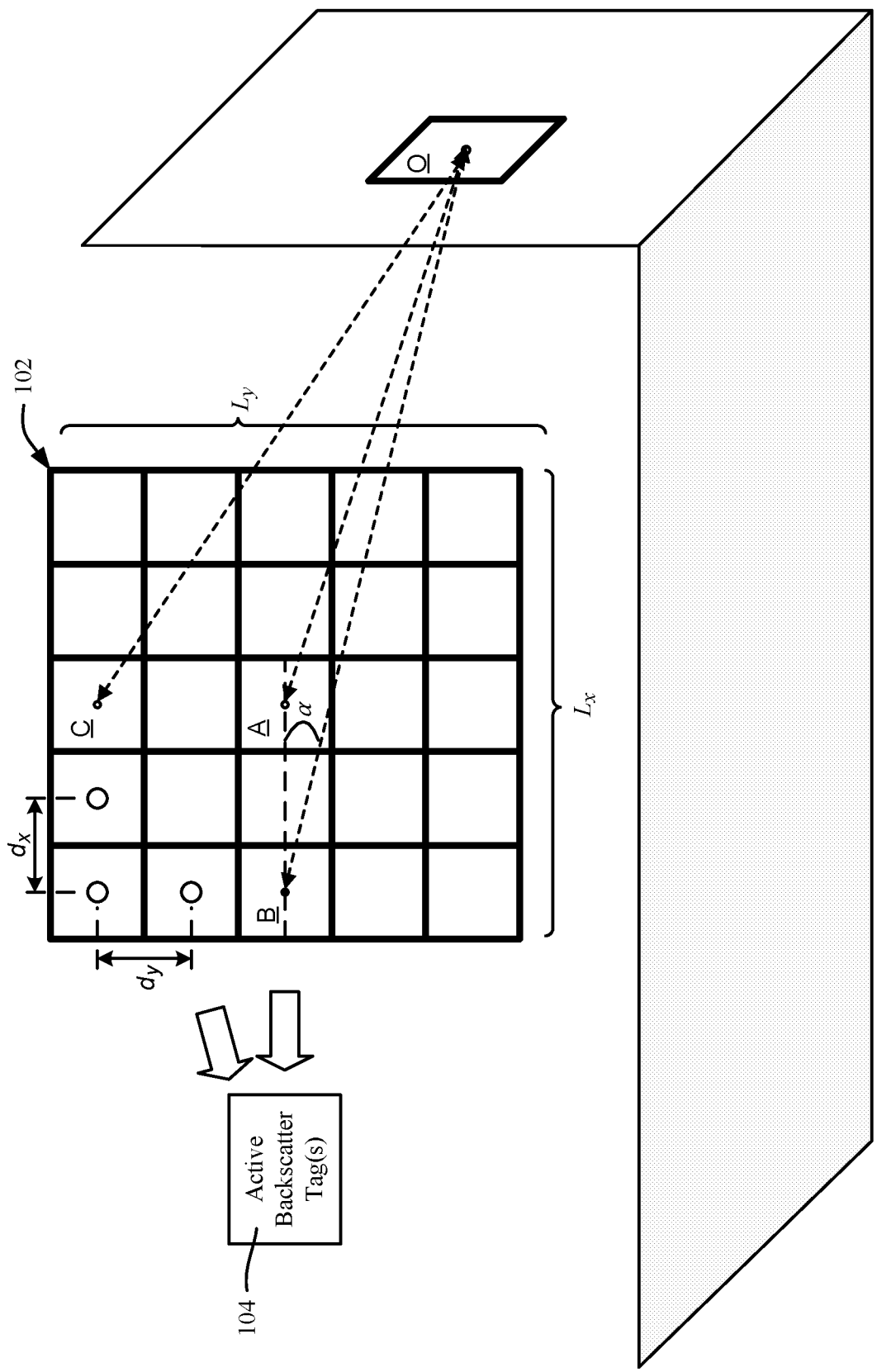
FIG. 1 is an example representation of a first phase of a calibration procedure used to accurately estimate the localization and orientation of an intelligent reflective surface relative to a transmission/reception point, in accordance with various aspects and implementations of the subject disclosure.

Various aspects of the technology described herein are generally directed towards calibration of an intelligent reflective surface including the estimation of the localization and orientation of the intelligent reflective surface. In one implementation, this is accomplished by leveraging the use of active tags and a protocol that allows the transmission of multifrequency (e.g., dual-tone) signals. A similar approach can be used to estimate the distance between the intelligent reflective surface elements and targets/user equipment. By measuring the accurate determination of the positions of three elements of a planar intelligent reflective surface, the phase delays along the path linking a transmission source (e.g., radar sensor/wireless access points/base station) and the m-th intelligent reflective surface element can be directly obtained and evaluated, and the path linking the m-th intelligent reflective surface element and a target/user equipment can be directly evaluated.

It should be understood that any of the examples herein are non-limiting. As one example, multifrequency (e.g., dual tone) radar, frequency-modulated continuous-wave radar, or a wireless access point or user equipment operating at a multifrequency (e.g., dual tone) mode are described with respect to accurate distance sensing, however other technologies can be leveraged by the technology described herein, including those not yet developed. Thus, any of the embodiments, aspects, concepts, structures, functionalities or examples described herein are non-limiting, and the technology may be used in various ways that provide benefits and advantages in communications and computing in general. It also should be noted that terms used herein, such as "optimize" or "optimal" and the like only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. Repetitive description of like elements employed in respective embodiments may be omitted for sake of brevity.

The following detailed description is merely illustrative and is not intended to limit embodiments and/or application or uses of embodiments. Furthermore, there is no intention to be bound by any expressed or implied information presented in the preceding sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it is to be understood that the present disclosure will be described in terms of a given illustrative architecture; however, other architectures, structures, substrate materials and process features, and steps can be varied within the scope of the present disclosure.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 2:
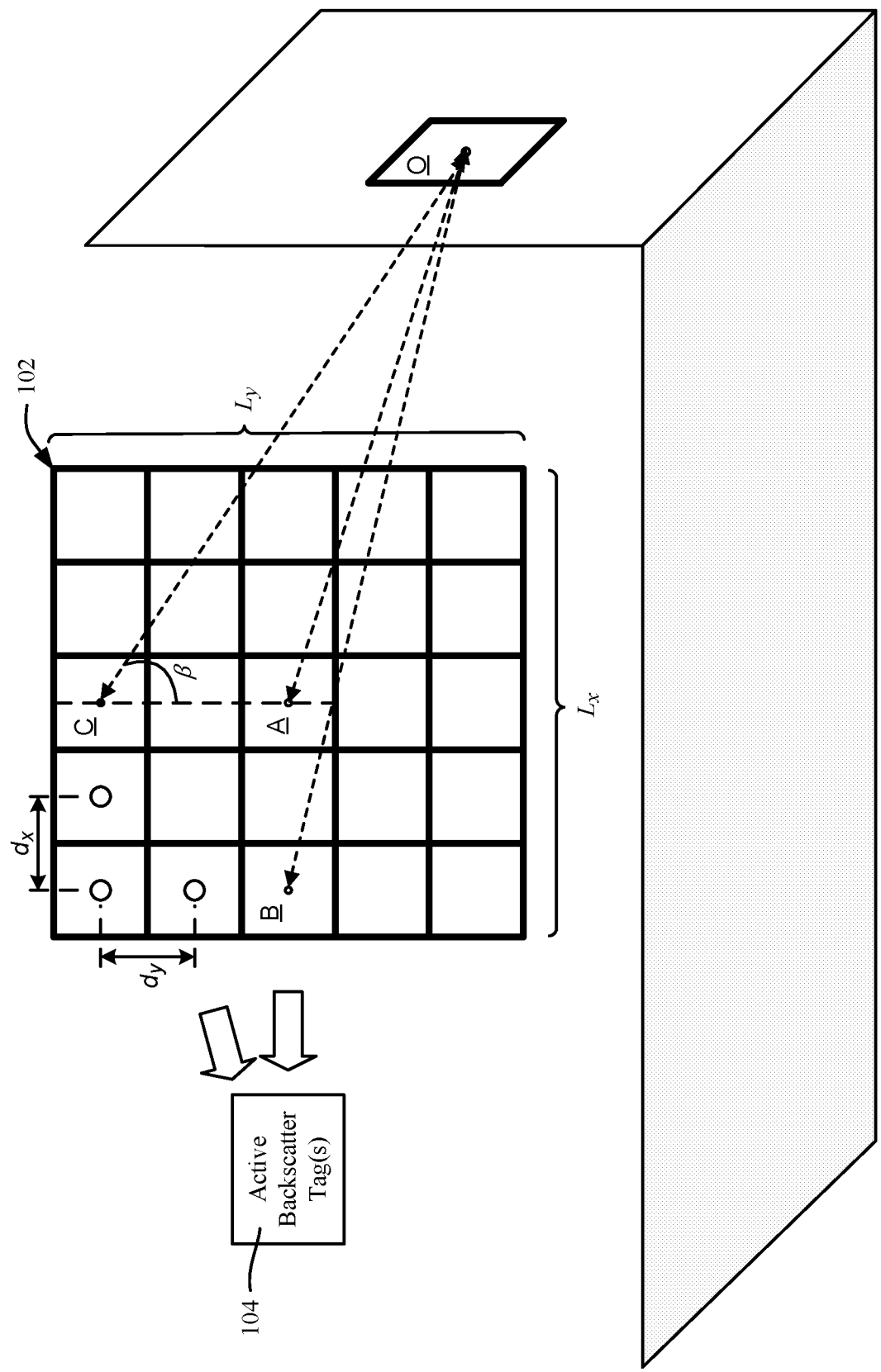
FIG. 2 is an example representation of a second phase of a calibration procedure used to accurately estimate the localization and orientation of the intelligent reflective surface, in accordance with various aspects and implementations of the subject disclosure.

A calibration procedure, as shown in FIGS. 1 and 2, facilitates the accurate estimation of the position of an intelligent reflective surface 102 relative to a transmission source/reception point O such as a base station, access point or radar. More particularly, before using an intelligent reflective surface to assist wireless communications or radar-based target detection, a calibration procedure is needed.

Note that the calibration procedure described herein is based on line-of-sight propagation between the transmitter and intelligent reflective surface, and the intelligent reflective surface and a user/target.

In one implementation, to significantly improve the accuracy of the range and angular measurements, specific elements of the intelligent reflective surface are modified to be also employed as an active backscatter tag 104 that can amplify/boost the impinging signals and retransmit the signals with no phase adjustment. An active tag can potentially also upconvert received signals and retransmit the upconverted signals with no phase adjustment. In general, active microwave/millimeter-wave tags can be customized radio frequency tags that have a power source (e.g., a battery) to operate. Although there is a need for power, the additional power consumption contributes to a significant improvement with respect to the accuracy of the measurements described herein.

As part of the calibration procedure, the points A, B, and C, corresponding to the centers of three selected elements are determined, which provides the equation for the plane that contains the intelligent reflective surface 102. In the example of FIGS. 1 and 2, the vectors $\overrightarrow{AB}$ and $\overrightarrow{AC}$ can be used as the coordinate axes (x and y axes) for the plane that contains the intelligent reflective surface 102. Furthermore, with the positions of points A, B and C having been accurately measured, the position of the center of each other element of the intelligent reflective surface 102 can be calculated, because when constructed with consistently-sized elements, the horizontal distance $d_x$ between any two horizontally adjacent elements is consistent and known, as is the vertical distance $d_y$ between any two vertically adjacent elements. In an intelligent reflective surface having square elements, the distance $d_x$ equals the distance $d_y$.

Also, because the position of the transmission/reception point O is known, the phase delays between any element (the m-th) element of the intelligent reflective surface and the base station, access point or radar corresponding to point O can be calculated in a straightforward manner. It should be noted that transmitter placed on point O possesses beamforming capability, so angular information also can be provided.

In one implementation, the relative distance and orientation of the elements placed on the horizontal direction is obtained and evaluated first. The calibration signals can be transmitted by a wireless access point operating at the dual tone protocol, a dual tone radar, or a frequency-modulated continuous-wave radar are boosted or upconverted by the active tag 104.

As shown in FIGS. 1 and 2, there are $L_x$ elements on each row of the intelligent reflective surface 102 and $L_y$ elements on each column of the intelligent reflective surface 102. In an implementation in which a center element is chosen, which in this example corresponds to point A, the (O to A) distance between the center of the intelligent reflective surface 102 and the transmitter is measured/estimated. There can be an active tag coupled to this center element, which can be turned on to activate the center element with respect to boosting reflected calibration signals to the transmission/reception point O. Note that using the dual-tone protocol, which establishes differences between transmitted calibration signals and those signals reflected (transmitted by the tag) back, is known for use in accurate distance determination, e.g., based on timing and phase differences. Other multifrequency (e.g., dual tone) radar or frequency-modulated continuous-wave radar systems can be similarly used to obtain distance measurements.

It should be noted that there can be an active tag at each of the three selected calibration elements, with one active tag turned on during calibration of its corresponding element, while the other two active tags are turned off. It is also feasible to have one active tag be coupled to a first element for calibration thereof, then decoupled from the first element and coupled to (switched to) a second element for calibration thereof, and so on for the third element. For purposes of explanation, in the described example implementation, a separate active tag is coupled to each selected element corresponding to points A, B and C, with one active tag turned on during one time while the other two active tags are turned off. It can be appreciated that the order of collecting the distance information is not significant, as long as the correct active tag and element measurement are synchronized.

Thus, in this example after the (O to A) distance is obtained, the active tag placed at the center of the intelligent reflective surface (point A) is turned off, and another tag placed at the border of the intelligent reflective surface 102 in the same row (point B in this example at the leftmost element) of the previously turned-on element is activated. Again, the transmitted signals are boosted (amplified or upconverted), and the (O to B) distance between the border element at the same row of the central element and the transmitter is determined. After the identification of the points A and B, an orientation angle of the intelligent reflective surface ($\alpha$, shown in FIG. 1) can be evaluated by $\cos(\alpha) = <\vec{OA}, \vec{AB}>/(|\vec{OA}| \cdot |\vec{AB}|)$, where $<\vec{OA}, \vec{AB}>$ is the scalar product between $\vec{OA}$ and $\vec{AB}$, $|\vec{OA}|$ is the length of the vector $\vec{OA}$, and $|\vec{AB}|$ is the length of the vector $\vec{AB}$. By construction, the distance between the center of the elements placed on the horizontal direction is $d_x$, where $d_y$ is known to the entity performing the calibration. As a result the horizontal distance to each other element is easily determined; suppose that the point at the center of the elements on the right and on the left of the central element is described by $E_{m_x}$. Therefore, $|\vec{OE}_{m_x}| = \sqrt{|\vec{OA}|^2 + (m_x d_x)^2 + 2<\vec{OC}, \vec{OE}_{m_x}>}$, where $m_x = 1, 2, 3, \ldots, L_x$.

It should be noted that distance to a center element provides a useful starting point A, although such an element need not be centered. Indeed, an m×n array of elements, in which at least one of m or n are even numbers, has no actual center element. However, as long as the relative matrix position of the element chosen relative to the other elements in the element matrix is known to the entity at point O, any element can be chosen as the starting element. Thus, in the example above, the elements at point A, B and C were selected elements for calibration; however if for example there was a sixth row with the five columns, point A might be again selected as the calibration element at point A (row 3, column 3), but the bottom right element would be known to be at row 6, column 5 (rather than row 5, column 5 as in FIGS. 1 and 2). Similarly, while more accurate plane estimates are achieved by having elements selected for calibration that are relatively far apart in separation from one another, e.g., the elements corresponding to points A and B, any two other elements can be chosen for calibration as long as their relative positions to one another are known.

A next phase of the calibration procedure is the evaluation of the distances/phase delays between the central element (corresponding to point A) and the other elements placed along the vertical direction at the same column as shown in FIG. 2. The calibration signals transmitted by the dual tone radar, the frequency-modulated continuous-wave radar, or the wireless access point operating at the dual tone mode are boosted by the active tag placed at the upper border (in this example; the lower border can instead be selected) of the intelligent reflective surface (e.g., at the same column of the central element). Then, the vector $\vec{OC}$ is evaluated. By construction, the distance between the center of the elements on the vertical direction is $d_y$, whereby supposing that the point at the center of the elements on the upper side of the central element is described by $E_{m_y}$, therefore, $|\vec{OE}_{m_y}| = \sqrt{|\vec{OC}|^2 + (m_y d_y)^2 + 2<\vec{OC}, \vec{OE}_{m_y}>}$, where $m_y = 1, 2, 3, \ldots, L_y$. The angle $\beta$ shown in FIG. 2 can be determined as described above with reference to the angle $\alpha$ of FIG. 1.

After the accurate estimation of the position of the points A, B, and C, the equation for the plane that contains the intelligent reflective surface 102 can be determined; the vectors $\vec{AB}$ and $\vec{AC}$ can be used as the coordinate axes (x and y axes) for the plane that contains the intelligent reflective surface 102. Furthermore, the position of the center for each element of the intelligent reflective surface on the y-axis can be calculated in the same way as the horizontal elements' positions were calculated, via $d_y$. Because the position of point O is known, the phase delays between any m-th element of the intelligent reflective surface 102 and the base station, access point or radar can be easily calculated.

It should be noted that while only three points need to be measured for the calibration procedure with a planar intelligent reflective surface, more points can be selected if desired, e.g., one at each corner. Further, a more complex (e.g., curved) surface, irregular or three-dimensional intelligent reflective surface may need the distance measured to more than three points.

Figure 3:
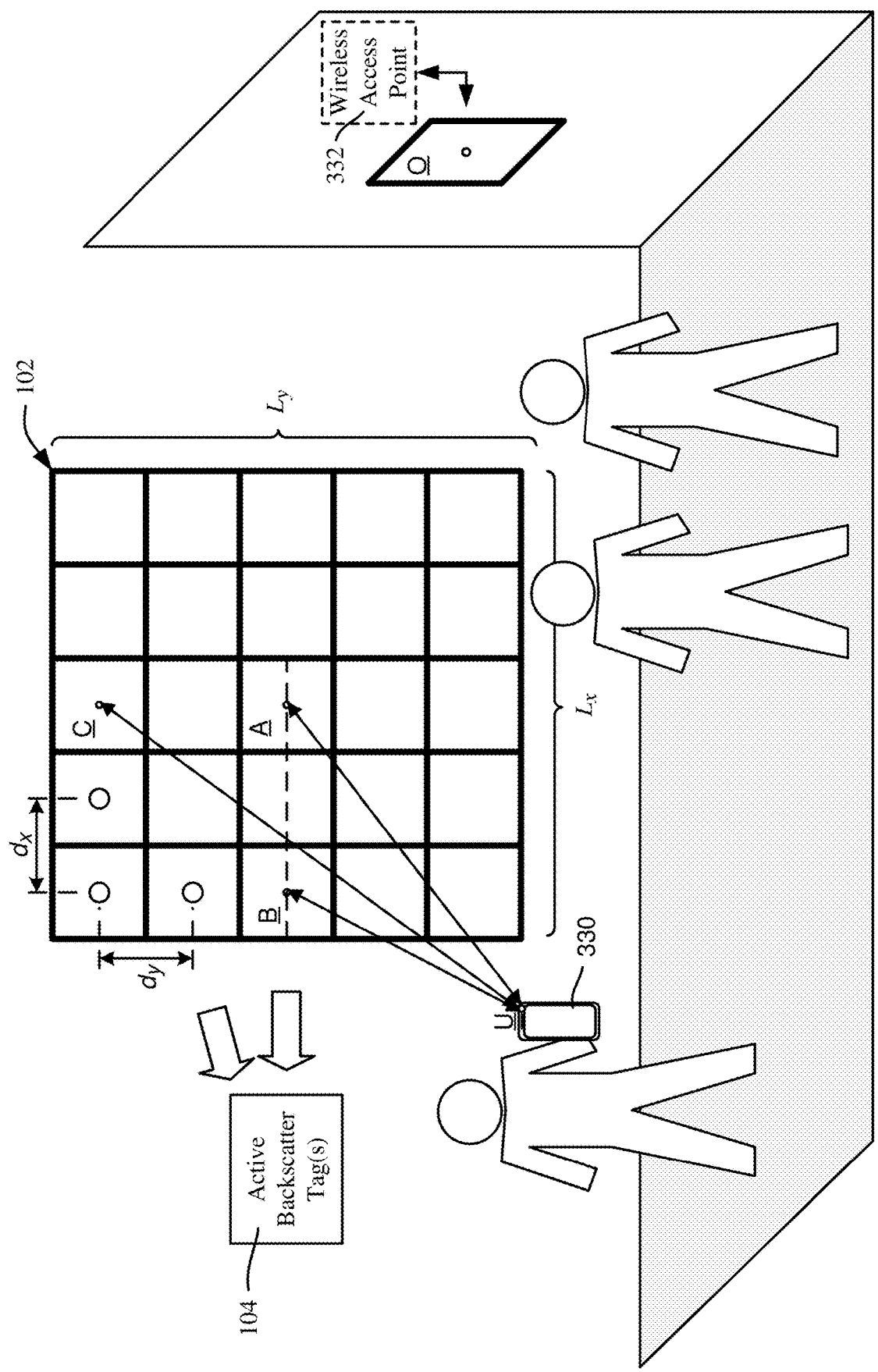
FIG. 3 is an example representation of a user equipment-originated calibration procedure that accurately estimates the localization and orientation of the intelligent reflective surface relative to the user equipment for intelligent reflective surface-assisted wireless communications, in accordance with various aspects and implementations of the subject disclosure.

As shown in FIG. 3, a user equipment 330 can perform a similar calibration procedure to that described with reference to FIGS. 1 and 2 in order to determine the respective distances to the respective elements of the intelligent reflective surface 102; in this instance, the transmission and reception point U is the user equipment 330. The user equipment 330 is configured with the dual tone mode protocol, and with an application or the like that signals the intelligent reflective surface 102 to enter a calibration mode, including, for example, to turn on the appropriate backscatter tag and turn off the others for the first, second and third distance measurement timeframes. Again, in the example of FIG. 3, the points A, B and C are used, as they are already coupled to their respective active backscatter tags in one implementation.

More particularly, the calibration procedure can be used if the network performance at the user needs to be improved. FIG. 3 exhibits an approach used to estimate the phase delays between the m-th element of the intelligent reflective surface 102 and the user equipment 330; to do so, the distances between the user and each element of the intelligent reflective surface 102 are calculated. By applying the same approach shown in FIGS. 1 and 2 with the dual tone protocol activated on the user equipment 330, the phase delays between the user and each element are calculated. By assuming that the user equipment 330, the access point, and the intelligent reflective surface 102 are part of the same local area or other network, this information can be shared with the intelligent reflective surface 102 controller (e.g., a microcontroller, MCU 770, FIG. 7). Because the calibration procedure between the intelligent reflective surface 102 and the wireless access point was previously performed, completing the calibration procedure for the intelligent reflective surface 102 can include the phase shifts for the intelligent reflective surface 102 being fully optimized for the user equipment 330 by making $\gamma_m = -(\gamma_{mAP} + \gamma_{Um})$, where $\gamma_m$ is the adjustable phase shift for the m-th element of the IRS, $\gamma_{mAP}$ is the phase delay between m-th element of the intelligent reflective surface 102 and the access point 332 (point O), and $\gamma_{Um}$ is the phase delay between the point U and the m-th element of the intelligent reflective surface 102.

Figure 4:
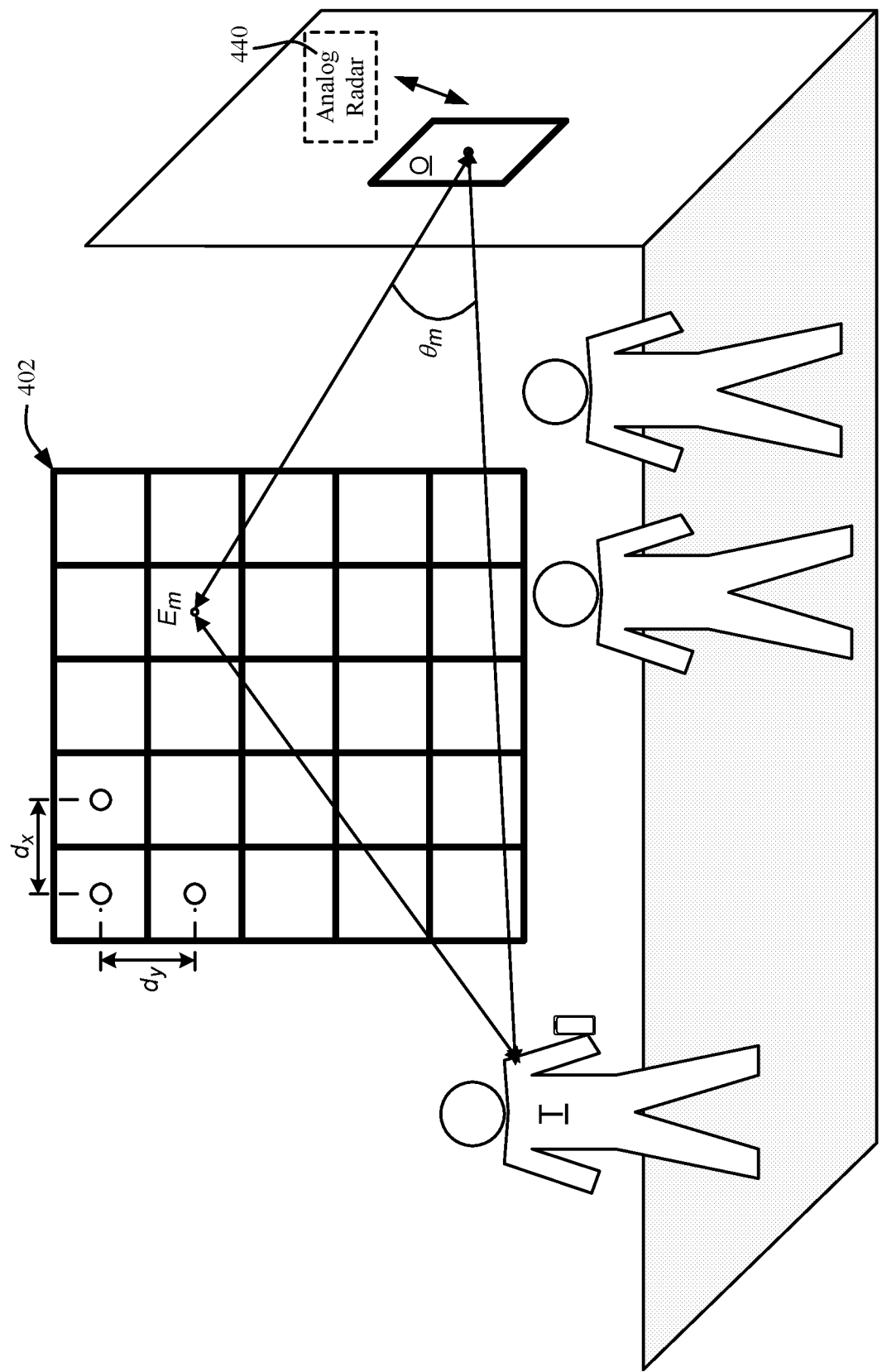
FIG. 4 is an example representation of radar-based target detection assisted by an intelligent reflective surface, in accordance with various aspects and implementations of the subject disclosure.

Turning to another example as shown in FIG. 4, consider that a frequency-modulated continuous-wave radar system 440 is employed at point O to scan the environment. If the signal-to-interference-plus-noise ratio (SINR) for one of the targets T is considerably small, an intelligent reflective surface system 402 can be activated to redirect the radio signal propagation from the radar 440 at point O to the target T, and/or from the target T to the intelligent reflective surface 102. After the generally rough estimation of the position of point T by the frequency-modulated continuous-wave radar system 440, the geometry problem that can determine any point (e.g., the point $E_m$ and the angle $\theta_m$ in FIG. 4) can be easily solved because the position of the center for each element of the intelligent reflective surface was previously calculated in the calibration procedure described herein.

Figure 5A:
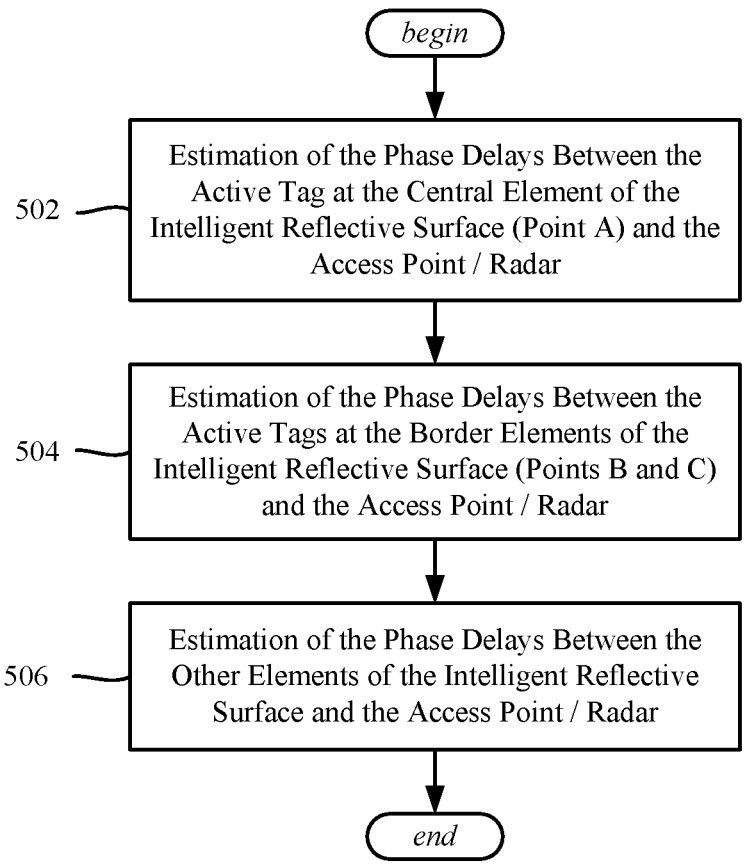
FIG. 5A is a flow diagram showing example operations that summarize intelligent reflective surface-access point/radar channel estimation and intelligent reflective surface-user equipment/target channel estimation, in accordance with various aspects and implementations of the subject disclosure.

FIG. 5A is a flow diagram showing example operations that summarize intelligent reflective surface-access point/radar channel estimation and intelligent reflective surface-user equipment/target channel estimation. Operation 502 represents the estimation of the phase delays between the active tag at the central element of the intelligent reflective surface (point A) and the access point/radar. Operation 504 represents the estimation of the phase delays between the active tags at the border elements of the intelligent reflective surface (points B and C) and the access point/radar. Operation 506 represents the estimation of the phase delays between the other elements of the intelligent reflective surface and the access point/radar.

Figure 5B:
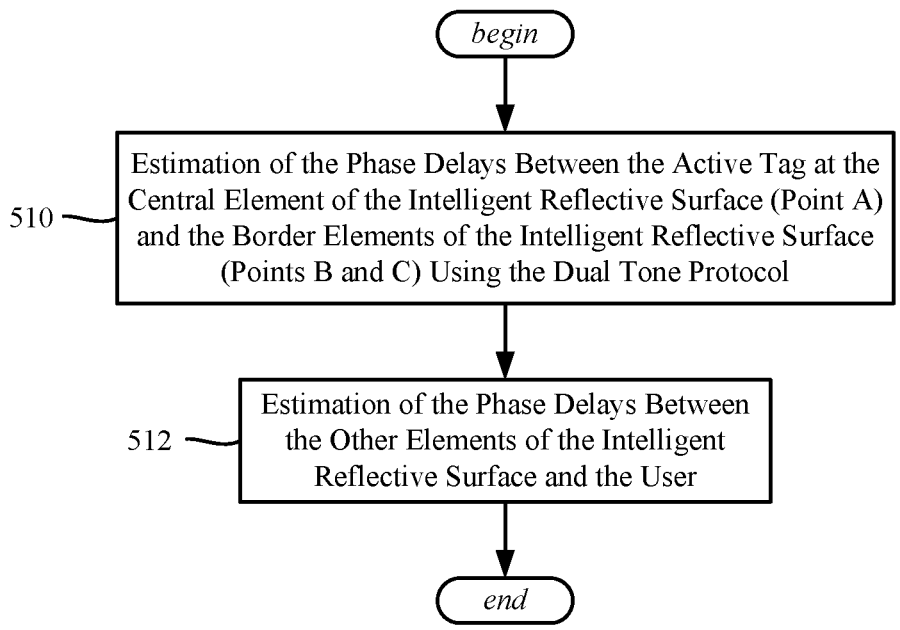
FIG. 5B is a flow diagram showing example operations that summarize intelligent reflective surface-user channel estimation based on active tag-enhanced sensing, in accordance with various aspects and implementations of the subject disclosure.

FIG. 5B is a flow diagram showing example operations that summarize intelligent reflective surface-user channel estimation based on active tag-enhanced sensing. Operation 510 represents the estimation of the phase delays between the active tag at the central element of the intelligent reflective surface (Point A) and, in this example the border elements of the intelligent reflective surface (Points B and C) using the dual tone protocol.

Figure 6:
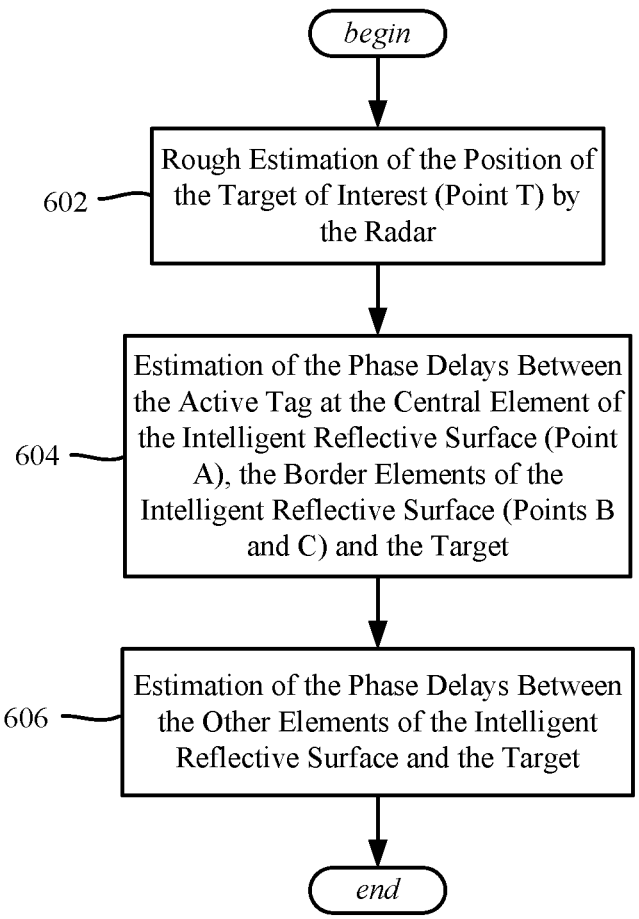
FIG. 6 is a flow diagram showing example operations that summarize intelligent reflective surface-target channel estimation based on active tag enhanced sensing, in accordance with various aspects and implementations of the subject disclosure.

FIG. 6 is a flow diagram showing example operations that summarize intelligent reflective surface-target channel estimation based on active tag enhanced sensing, in accordance with various aspects and implementations of the subject disclosure. Operation 602 represents the rough estimation of the position of the target of interest (Point T) by the radar. Operation 604 represents the estimation of the phase delays between the active tag at the central element of the intelligent reflective surface (Point A), the border elements of the intelligent reflective surface (Points B and C) and the target. Operation 606 represents the estimation of the phase delays between the other elements of the intelligent reflective surface and the target.

Figure 7:
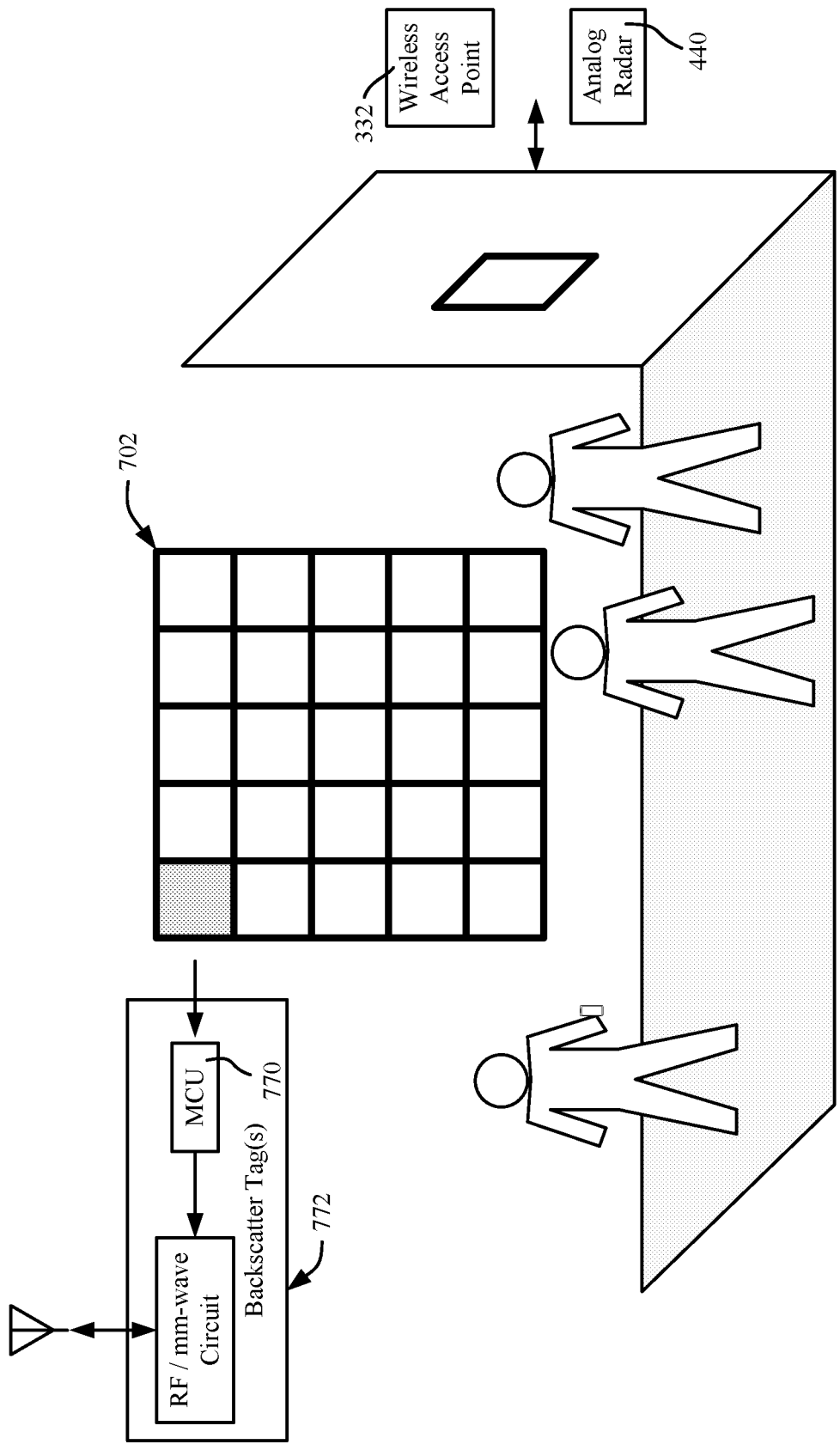
FIG. 7 is a block diagram representation of wireless communications/radar-based sensing assisted by an intelligent reflective surface, in accordance with various aspects and implementations of the subject disclosure.

Thus, the technology described herein is highly suitable for intelligent reflective surface-assisted wireless communications and sensing applications. FIG. 7 shows an example block diagram for one implementation of radar-based sensing assisted by an intelligent reflective surface. The wireless access point 332 and the analog radar 440 can be embedded inside a box or other suitable container, along with other sensors such as including, but not limited to, a thermostat, ultrasound sensor(s), and voice detection and recognition sensor(s). As is understood, the example components described herein, including the wireless access point 332, the analog radar 440, the user equipment 330, and the MCU 770 can include or be coupled to a processor as broadly defined herein, e.g., any data processing and/or instruction execution component(s)/device(s).

Because the direct path between the access point 332/radar 440 and the target of interest may be fully or partially obstructed by other objects, the use of the intelligent reflective surface 702 can substantially improve the wireless network/radar performance, especially in crowded indoor scenarios. In the example implementation of FIG. 7, the intelligent reflective surface 702 with active tag(s) 772 positioned in known locations of the element matrix (e.g., points A, B, and C) of the (rectangular) intelligent reflective surface 702 placed on a wall.

It should be noted that the sizes shown in the figures represented herein are not intended to convey any relative size of any object (e.g., human), the components, and/or of the intelligent reflective surfaces. Indeed, the elements of the intelligent reflective surfaces in the figures are intentionally depicted as large, (e.g., considering a typical element's size relative to human representations) so that the points, angles, relative element distances and so forth can be more clearly presented.

Figure 8:
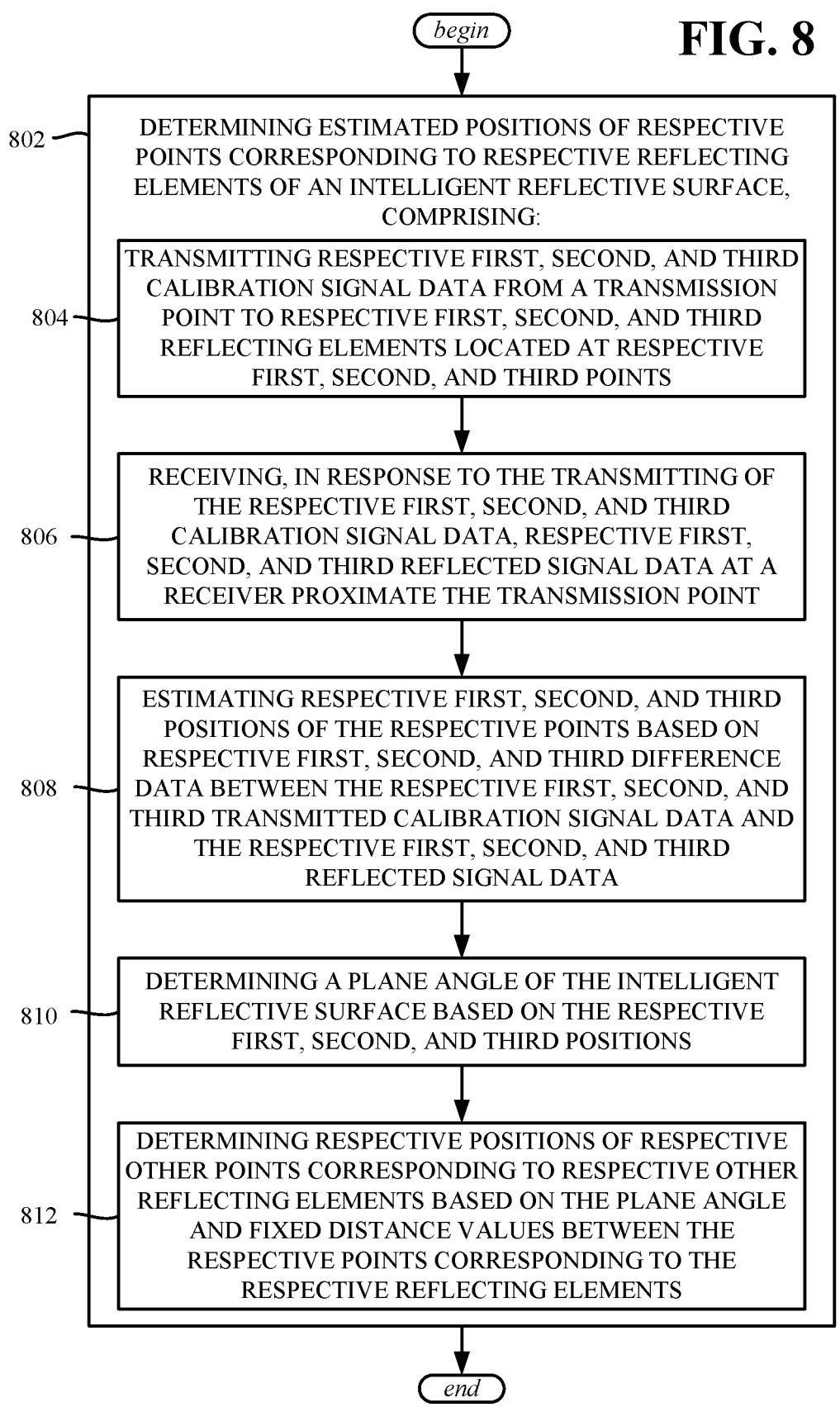
FIG. 8 is a flow diagram showing example operations related to determining estimated positions of respective points corresponding to respective reflecting elements of an intelligent reflective surface, in accordance with various aspects and implementations of the subject disclosure.

One or more aspects can be embodied in a system, such as represented in the example operations of FIG. 8, and for example can include a memory that stores computer executable components and/or operations, and a processor that executes computer executable components and/or operations stored in the memory. Example operations can include operation 802, which represents determining estimated positions of respective points corresponding to respective reflecting elements of an intelligent reflective surface, including operations 804-812. Operation 804 represents transmitting respective first, second, and third calibration signal data from a transmission point to respective first, second, and third reflecting elements located at respective first, second, and third points. Operation 806 represents receiving, in response to the transmitting of the respective first, second, and third calibration signal data, respective first, second, and third reflected signal data at a receiver proximate to the transmission point. Operation 808 represents estimating respective first, second, and third positions of the respective points based on respective first, second, and third difference data between the respective first, second, and third transmitted calibration signal data and the respective first, second, and third reflected signal data. Operation 810 represents determining a plane angle of the intelligent reflective surface based on the respective first, second, and third positions. Operation 812 represents determining respective positions of respective other points corresponding to respective other reflecting elements based on the plane angle and fixed distance values between the respective points corresponding to the respective reflecting elements.

Further operations can include determining respective phase delay data for the respective reflecting elements of the intelligent reflective surface based on the respective positions of the respective other points corresponding to the respective other reflecting elements.

Further operations can include outputting the respective phase delay data for adjustment of a reflecting coefficient matrix associated with the intelligent reflective surface for redirection of an electromagnetic way to a target location.

The respective first, second, and third difference data can be based on respective first, second, and third phase delay data between the respective first, second, and third transmitted calibration signal data and the respective first, second, and third reflected signal data.

The first calibration signal data can include multitone radar electromagnetic wave data.

The first calibration signal data can include frequency-modulated continuous-wave data.

The first calibration signal data can include multitone mode wireless communications frequency electromagnetic wave data.

The first reflecting element can be coupled to an active backscatter tag that boosts the first reflected signal data.

The first reflecting element can be located proximate to a center of the intelligent reflective surface.

The second reflecting element can be located proximate to a horizontal border of the intelligent reflective surface.

The third reflecting element can be located proximate to a vertical border of the intelligent reflective surface.

Figure 9:
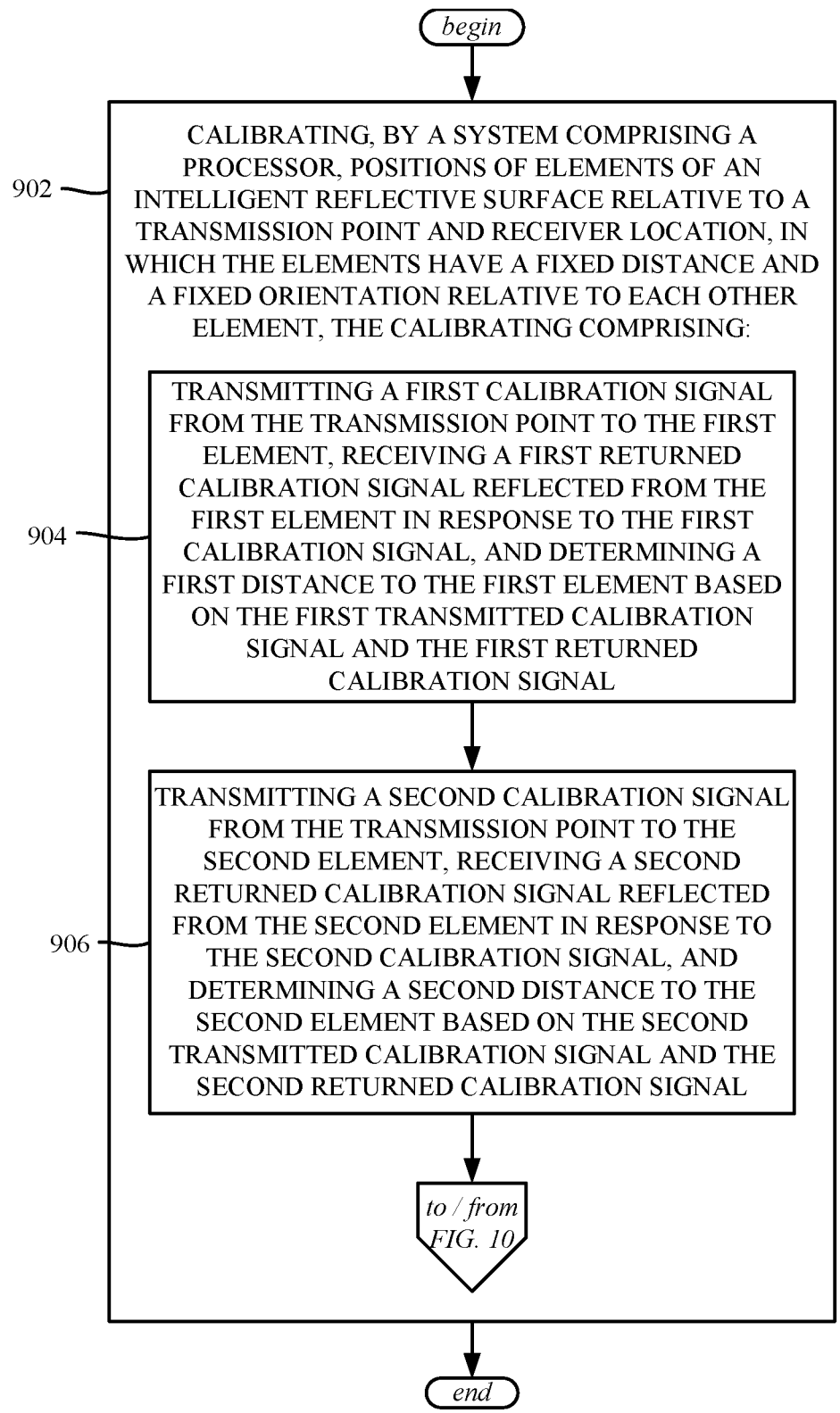
FIGS. 9 and 10 comprise a flow diagram showing example operations related to calibrating positions of elements of an intelligent reflective surface relative to a transmission point and receiver location, in accordance with various aspects and implementations of the subject disclosure.
Figure 10:
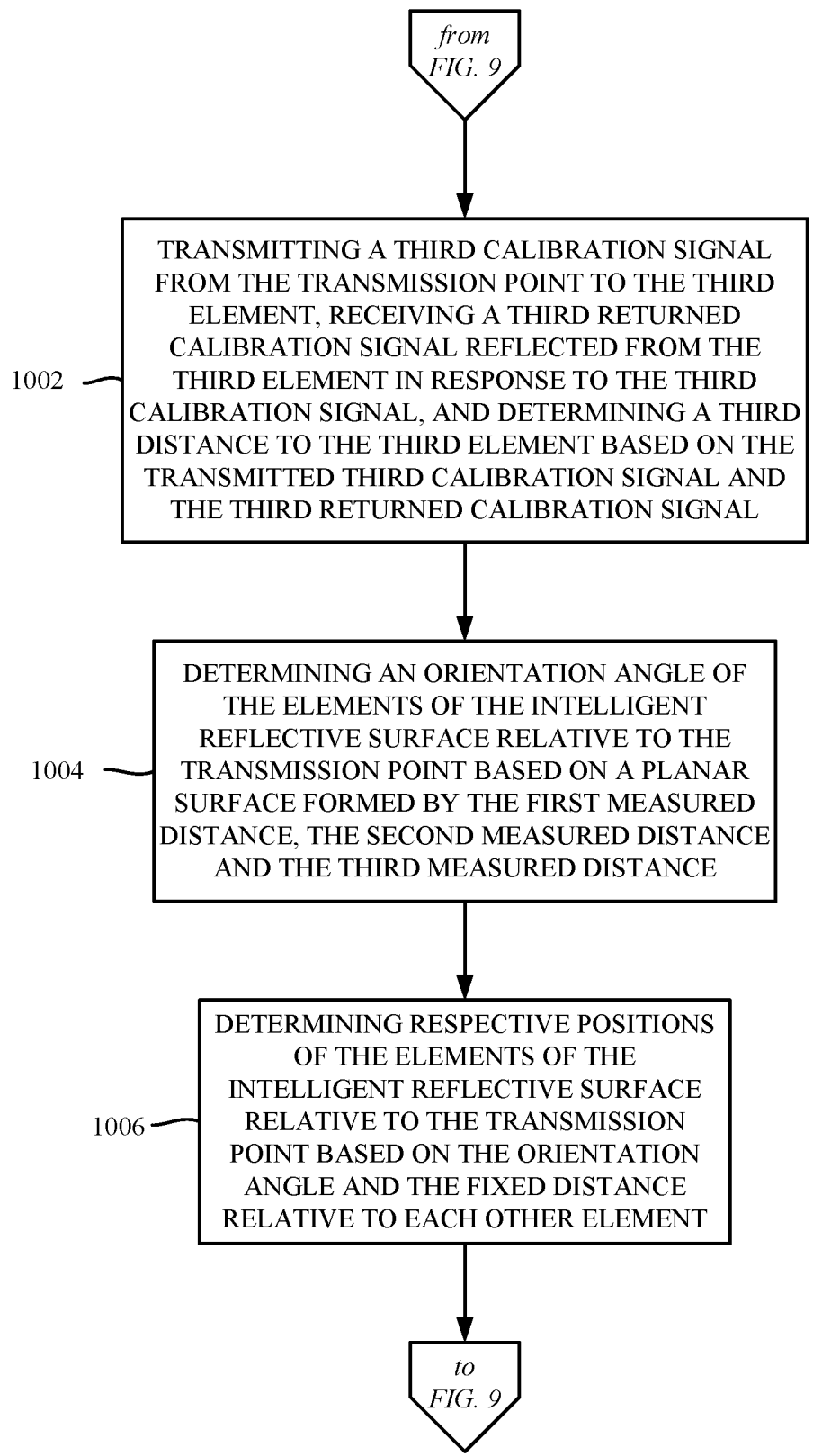

One or more example aspects, such as corresponding to example operations of a method, are represented in FIGS. 9 and 10. Example operation 902 represents calibrating, by a system comprising a processor, positions of elements of an intelligent reflective surface relative to a transmission point and receiver location, in which the elements have a fixed distance and a fixed orientation relative to each other element. The calibrating can include operations 904 and 906 of FIG. 9, and operations 1002, 1004 and 1006 of FIG. 10.

Example operation 904 represents transmitting a first calibration signal from the transmission point to the first element, receiving a first returned calibration signal reflected from the first element in response to the first calibration signal, and determining a first distance to the first element based on the first transmitted calibration signal and the first returned calibration signal. Example operation 906 represents transmitting a second calibration signal from the transmission point to the second element, receiving a second returned calibration signal reflected from the second element in response to the second calibration signal, and determining a second distance to the second element based on the second transmitted calibration signal and the second returned calibration signal. Continuing at FIG. 10, example operation 1002 represents transmitting a third calibration signal from the transmission point to the third element, receiving a third returned calibration signal reflected from the third element in response to the third calibration signal, and determining a third distance to the third element based on the transmitted third calibration signal and the third returned calibration signal. Example operation 1004 represents determining an orientation angle of the elements of the intelligent reflective surface relative to the transmission point based on a planar surface formed by the first measured distance, the second measured distance and the third measured distance. Example operation 1006 represents determining respective positions of the elements of the intelligent reflective surface relative to the transmission point based on the orientation angle and the fixed distance relative to each other element.

Further operations can include determining, by the system, respective phase delay data for the respective reflecting elements of an intelligent reflective surface based on the respective positions of the respective other points corresponding to the respective other reflecting elements.

Transmitting the first calibration signal can occur during a first timeframe and is intended for reception by a first selected element that is configured for boosting the first returned calibration signal during the first timeframe, transmitting the second calibration signal can occur during a second timeframe that is different from the first timeframe and is intended for reception by a second selected element that is configured for boosting the second returned calibration signal during the second timeframe, and transmitting the third calibration signal can occur during a third timeframe that is different from the first timeframe and the second timeframe and is intended for reception by a third selected element that is configured for boosting the third returned calibration signal during the third timeframe.

The first selected element can be located proximate to a center of the intelligent reflective surface, the second reflecting element can be located proximate to a horizontal border of the intelligent reflective surface, and the third reflecting element can be located proximate to a vertical border of the intelligent reflective surface.

The first selected element can couple to a first active backscatter tag that is turned on during the first timeframe and turned off during the second timeframe and the third timeframe, the second selected element can couple to a second active backscatter tag that is turned on during the second timeframe and turned off during the first timeframe and the third timeframe, and the third selected element can couple to a third active backscatter tag that is turned on during the third timeframe and turned off during the first timeframe and the second timeframe.

Further operations can include determining, by the system, respective distances from the respective positions of the elements to a target.

Figure 12:
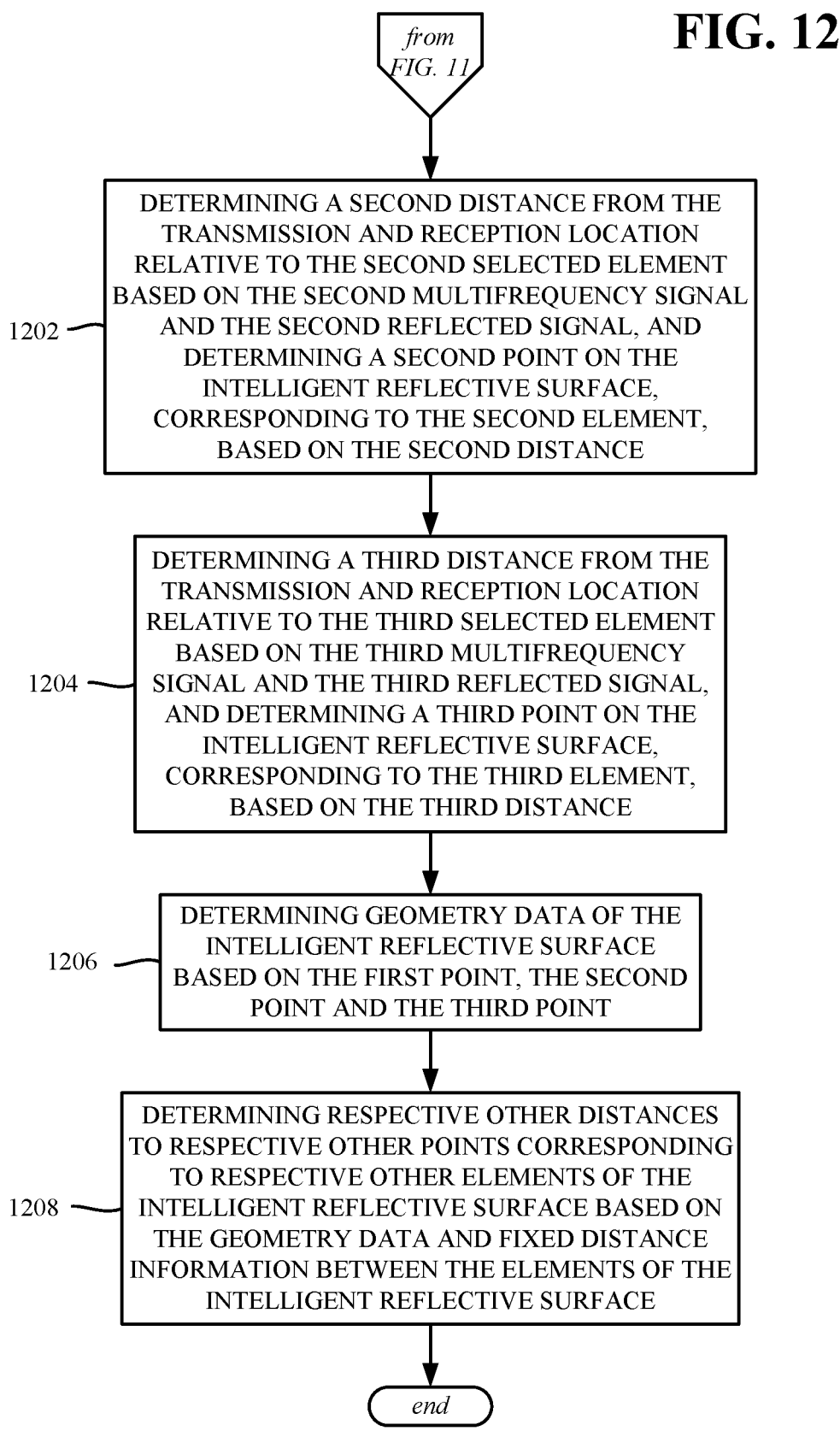

FIGS. 11 and 12 summarize various example operations, e.g., corresponding to a machine-readable medium, comprising executable instructions that, when executed by a processor, facilitate performance of operations. Example operation 1102 of FIG. 11 represents transmitting a first multifrequency signal from a transmission and reception location to a first selected element of an intelligent reflective surface, and receiving at the transmission and reception location a first reflected signal from the first selected element in response to the transmitting of the first multifrequency signal. Example operation 1104 represents transmitting a second multifrequency signal from the transmission and reception location to a second selected element of an intelligent reflective surface, and receiving at the transmission and reception location a second reflected signal from the second selected element in response to the transmitting of the second multifrequency signal. Example operation 1106 represents transmitting a third multifrequency signal from the transmission and reception location to a third selected element of an intelligent reflective surface, and receiving at the transmission and reception location a third reflected signal from the third selected element in response to the transmitting of the third multifrequency signal. Example operation 1108 represents determining a first distance from the transmission and reception location relative to the first selected element based on the first multifrequency signal and the first reflected signal, and determining a first point on the intelligent reflective surface, corresponding to the first element, based on the first distance. Continuing at FIG. 12, example operation 1202 represents determining a second distance from the transmission and reception location relative to the second selected element based on the second multifrequency signal and the second reflected signal, and determining a second point on the intelligent reflective surface, corresponding to the second element, based on the second distance. Example operation 1204 represents determining a third distance from the transmission and reception location relative to the third selected element based on the third multifrequency signal and the third reflected signal, and determining a third point on the intelligent reflective surface, corresponding to the third element, based on the third distance. Example operation 1206 represents determining geometry data of the intelligent reflective surface based on the first point, the second point and the third point. Example operation 1208 represents determining respective other distances to respective other points corresponding to respective other elements of the intelligent reflective surface based on the geometry data and fixed distance information between the elements of the intelligent reflective surface.

The first selected element can be located proximate to a center of the intelligent reflective surface, the second reflecting element can be located proximate to a horizontal border of the intelligent reflective surface, and the third reflecting element can be located proximate to a vertical border of the intelligent reflective surface.

The first selected element can couple to a first active backscatter tag that is turned on during the first timeframe to boost the first reflected signal and turned off during the second timeframe and the third timeframe, the second selected element can couple to a second active backscatter tag that is turned on during the second timeframe to boost the second reflected signal and turned off during the first timeframe and the third timeframe, and the third selected element can couple to a third active backscatter tag that is turned on during the third timeframe to boost the third reflected signal and turned off during the first timeframe and the second timeframe.

As can be seen, the technology described herein facilitates a calibration procedure for determining distances to the elements of an intelligent reflective surface from a transmission/reception point and/or user device. By employing the described tag-enhanced sensing, the hardware-based technology described herein provides accurate distances that can be used to optimize the phase shift of each element with respect to redirecting (e.g., reflecting or refracting) an impinging electromagnetic wave, whereby an optimal phase design for an intelligent reflective surface reflect or transmit beamforming can be accurately provided. Phase shift optimization for intelligent reflective surface-assisted radar-based sensing is also facilitated.

The calibration procedure for determining elements' distances as described herein significantly reduces the computational load needed to fully automate the phase shifts optimization for an intelligent reflective surface reflection matrix. Indeed, only algorithms for the optimization of the beamforming vector(s) need to be formulated for a given environment state/scenario, unlike other high complexity algorithms that are based on non-convex and convex approximations.

What is described herein include mere examples. It is, of course, not possible to describe every conceivable combination of components, materials or the like for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further, as employed in the subject specification, the terms "processor" and "controller" can refer to substantially any computing processing unit or device that can execute computer instructions from a machine-readable medium (which can be part of the unit or device or coupled thereto) so as to process data. Examples can include, but are not limited to an integrated circuit, an application specific integrated circuit, a digital signal processor, a field programmable gate array, a programmable logic controller, a microcontroller, a complex programmable logic device, a discrete gate or transistor logic, discrete hardware components, or any combination thereof designed to perform the functions described herein. Other examples include, but are not limited to single-core processors, single-processors with software multithread execution capability, multi-core processors, multi-core processors with software multithread execution capability, multi-core processors with hardware multithread technology, parallel platforms, and parallel platforms with distributed shared memory. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," and the like are intended to refer to a machine-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
   determining estimated positions of respective points corresponding to respective reflecting elements of an intelligent reflective surface, comprising:
   transmitting respective first, second, and third calibration signal data from a transmission point to respective first, second, and third reflecting elements located at respective first, second, and third points;
   receiving, in response to the transmitting of the respective first, second, and third calibration signal data, respective first, second, and third reflected signal data at a receiver proximate to the transmission point;
   estimating respective first, second, and third positions of the respective points based on respective first, second, and third difference data between the respective first, second, and third transmitted calibration signal data and the respective first, second, and third reflected signal data;
   determining a plane angle of the intelligent reflective surface based on the respective first, second, and third positions; and
   determining respective positions of respective other points corresponding to respective other reflecting elements based on the plane angle and fixed distance values between the respective points corresponding to the respective reflecting elements.

2. The system of claim 1, wherein the operations further comprise determining respective phase delay data for the respective reflecting elements of the intelligent reflective surface based on the respective positions of the respective other points corresponding to the respective other reflecting elements.

3. The system of claim 1, wherein the operations further comprise outputting the respective phase delay data for adjustment of a reflecting coefficient matrix associated with the intelligent reflective surface for redirection of an electromagnetic way to a target location.

4. The system of claim 1, wherein the respective first, second, and third difference data are based on respective first, second, and third phase delay data between the respective first, second, and third transmitted calibration signal data and the respective first, second, and third reflected signal data.

5. The system of claim 1, wherein the first calibration signal data comprises multitone radar electromagnetic wave data.

6. The system of claim 1, wherein the first calibration signal data comprises frequency-modulated continuous-wave data.

7. The system of claim 1, wherein the first calibration signal data comprises multitone mode wireless communications frequency electromagnetic wave data.

8. The system of claim 1, wherein the first reflecting element is coupled to an active backscatter tag that boosts the first reflected signal data.

9. The system of claim 1, wherein the first reflecting element is located proximate to a center of the intelligent reflective surface.

10. The system of claim 1, wherein the second reflecting element is located proximate to a horizontal border of the intelligent reflective surface.

11. The system of claim 1, wherein the third reflecting element is located proximate to a vertical border of the intelligent reflective surface.

12. A method, comprising:
    calibrating, by a system comprising a processor, positions of elements of an intelligent reflective surface relative to a transmission point and receiver location, in which the elements have a fixed distance and a fixed orientation relative to each other element, the calibrating comprising:
    transmitting a first calibration signal from the transmission point to the first element, receiving a first returned calibration signal reflected from the first element in response to the first calibration signal, and determining a first distance to the first element based on the first transmitted calibration signal and the first returned calibration signal;
    transmitting a second calibration signal from the transmission point to the second element, receiving a second returned calibration signal reflected from the second element in response to the second calibration signal, and determining a second distance to the second element based on the second transmitted calibration signal and the second returned calibration signal;
    transmitting a third calibration signal from the transmission point to the third element, receiving a third returned calibration signal reflected from the third element in response to the third calibration signal, and determining a third distance to the third element based on the transmitted third calibration signal and the third returned calibration signal;
    determining an orientation angle of the elements of the intelligent reflective surface relative to the transmission point based on a planar surface formed by the first measured distance, the second measured distance and the third measured distance; and
    determining respective positions of the elements of the intelligent reflective surface relative to the transmission point based on the orientation angle and the fixed distance relative to each other element.

13. The method of claim 12, wherein the first selected element is located proximate to a center of the intelligent reflective surface, wherein the second reflecting element is located proximate to a horizontal border of the intelligent reflective surface, and wherein the third reflecting element is located proximate to a vertical border of the intelligent reflective surface.

14. The method of claim 12, further comprising determining, by the system, respective phase delay data for the respective reflecting elements of an intelligent reflective surface based on the respective positions of the respective other points corresponding to the respective other reflecting elements.

15. The method of claim 12, wherein the transmitting of the first calibration signal occurs during a first timeframe and is intended for reception by a first selected element that is configured for boosting the first returned calibration signal during the first timeframe, wherein the transmitting of the second calibration signal occurs during a second timeframe that is different from the first timeframe and is intended for reception by a second selected element that is configured for boosting the second returned calibration signal during the second timeframe, and wherein the transmitting of the third calibration signal occurs during a third timeframe that is different from the first timeframe and the second timeframe and is intended for reception by a third selected element that is configured for boosting the third returned calibration signal during the third timeframe.

16. The method of claim 15, wherein the first selected element couples to a first active backscatter tag that is turned on during the first timeframe and turned off during the second timeframe and the third timeframe, wherein the second selected element couples to a second active backscatter tag that is turned on during the second timeframe and turned off during the first timeframe and the third timeframe, and wherein the third selected element couples to a third active backscatter tag that is turned on during the third timeframe and turned off during the first timeframe and the second timeframe.

17. The method of claim 12, further comprising determining, by the system, respective distances from the respective positions of the elements to a target.

18. A non-transitory machine-readable medium, comprising executable instructions that, when executed by a processor, facilitate performance of operations, the operations comprising:
transmitting a first multifrequency signal from a transmission and reception location to a first selected element of an intelligent reflective surface, and receiving at the transmission and reception location a first reflected signal from the first selected element in response to the transmitting of the first multifrequency signal;
transmitting a second multifrequency signal from the transmission and reception location to a second selected element of an intelligent reflective surface, and receiving at the transmission and reception location a second reflected signal from the second selected element in response to the transmitting of the second multifrequency signal;
transmitting a third multifrequency signal from the transmission and reception location to a third selected element of an intelligent reflective surface, and receiving at the transmission and reception location a third reflected signal from the third selected element in response to the transmitting of the third multifrequency signal;
determining a first distance from the transmission and reception location relative to the first selected element based on the first multifrequency signal and the first reflected signal, and determining a first point on the intelligent reflective surface, corresponding to the first element, based on the first distance;
determining a second distance from the transmission and reception location relative to the second selected element based on the second multifrequency signal and the second reflected signal, and determining a second point on the intelligent reflective surface, corresponding to the second element, based on the second distance;
determining a third distance from the transmission and reception location relative to the third selected element based on the third multifrequency signal and the third reflected signal, and determining a third point on the intelligent reflective surface, corresponding to the third element, based on the third distance;
determining geometry data of the intelligent reflective surface based on the first point, the second point and the third point; and
determining respective other distances to respective other points corresponding to respective other elements of the intelligent reflective surface based on the geometry data and fixed distance information between the elements of the intelligent reflective surface.

19. The non-transitory machine-readable medium of claim 18, wherein the first selected element is located proximate to a center of the intelligent reflective surface, wherein the second reflecting element is located proximate to a horizontal border of the intelligent reflective surface, and wherein the third reflecting element is located proximate to a vertical border of the intelligent reflective surface.

20. The non-transitory machine-readable medium of claim 18, wherein the first selected element couples to a first active backscatter tag that is turned on during the first timeframe to boost the first reflected signal and turned off during the second timeframe and the third timeframe, wherein the second selected element couples to a second active backscatter tag that is turned on during the second timeframe to boost the second reflected signal and turned off during the first timeframe and the third timeframe, and wherein the third selected element couples to a third active backscatter tag that is turned on during the third timeframe to boost the third reflected signal and turned off during the first timeframe and the second timeframe.

* * * * *